(No Model.)
S. R. ESTEP.
CULTIVATOR FOOT.
No. 377,998. Patented Feb. 14, 1888.
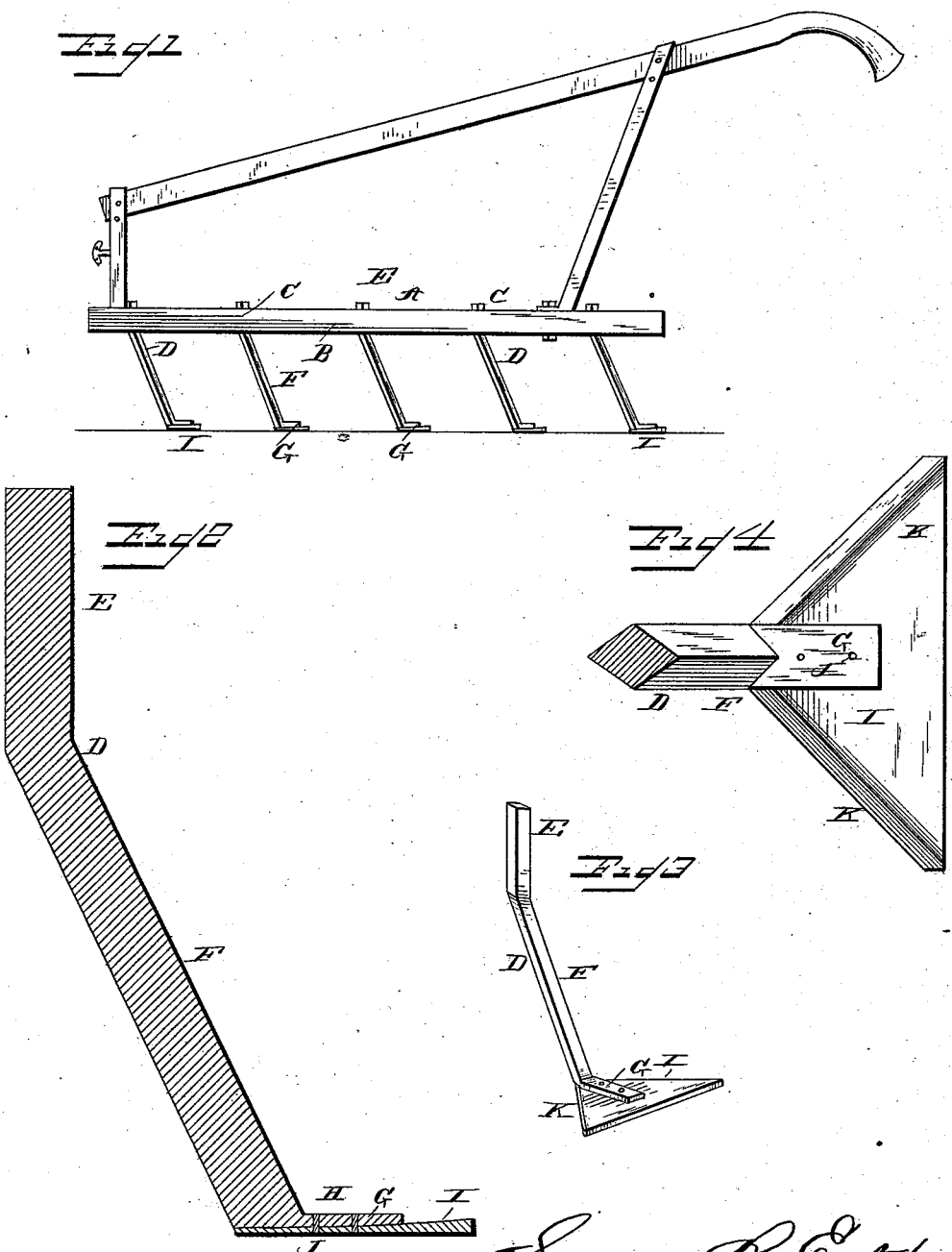
WITNESSES
F. L. Durand
Benj. H. Cowl
INVENTOR
Simeon R. Estep
by Louis Bagger & Co.
Attorneys

UNITED STATES PATENT OFFICE.

SIMEON R. ESTEP, OF LADY LAKE, FLORIDA.

CULTIVATOR-FOOT.

SPECIFICATION forming part of Letters Patent No. 377,998, dated February 14, 1888.

Application filed September 17, 1887. Serial No. 249,934. (No model.)

*To all whom it may concern:*

Be it known that I, SIMEON R. ESTEP, a citizen of the United States, and a resident of Lady Lake, in the county of Sumter and State of Florida, have invented certain new and useful Improvements in Cultivator-Feet; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of a cultivator or harrow provided with my new and improved cultivator tooth or hoe. Fig. 2 is a central vertical sectional view taken through the center of the blade and its shank and on an enlarged scale. Fig. 3 is a perspective detail view of one of the cutting-plates and its shank on an enlarged scale; and Fig. 4 is a transverse sectional view of the shank, looking downward on the plate.

The same letters of reference indicate corresponding parts in all the figures.

My invention relates to harrows or cultivators; and it consists in a new and improved cultivator foot or hoe, the teeth or feet of which are adapted to be secured in the frame of any kind of ordinary harrow which is adapted to contain the usual square harrow-teeth, and my invention will be hereinafter fully described and claimed.

Referring to the several parts by letter, A indicates the frame of an ordinary harrow of the usual construction, the horizontal bars B of which are formed with the usual vertical openings, C, through which and in which the ordinary harrow-teeth are adapted to be secured, and in which I have shown my new and improved cultivator teeth or feet secured in their operative positions.

D indicates the shank of my new and improved harrow or cultivator feet or hoe, the upper part, E, of which is secured in one of the vertical perforations C of the harrow-frame, the said part being square in cross-section, while just below the harrow-frame the said stem or shank is bent back slanting at an angle, as shown in the drawings. The main part F of the stem or shank thus inclines backward and downward, so that in operation it will glance, pass readily and easily over roots &c., and will not gather trash. The main part of the stem or shank is of the same shape in cross-section as the upper part thereof—square—and is set so that one of its longitudinal edges or corners is at the front, which arrangement of course assists greatly in causing the stem to pass readily through leaves or trash, and thus prevents it from gathering trash while in operation.

The bottom or lower end of the shank or stem D has turned or formed on it the small flat plate G, which extends back parallel with the surface of the ground at an angle with the stem itself, this projecting plate being usually formed of the same width as the shank, but quite thin in comparison, and flattened, as shown most plainly in the sectional view, Fig. 2 of the drawings. This plate is likewise formed with the two or more bolt-holes H H, through which pass the bolts or rivets which secure the cutting-plate I to the lower end of the rearwardly-inclined shank.

I indicates the three-cornered cutting-plate of my invention. This plate is formed of a thin flat steel in the three-cornered or wide V shape shown, being formed at its central corner with its edges meeting at a right angle, while its other two corners are formed at an acute angle, as shown, and at its widest or right-angled corner the plate is bolted or riveted to the rearwardly-projecting flat plate G, formed on the lower end of the rearwardly-inclined stem D, by means of bolts or rivets J, passing through the said end of the cutting-plate and through the apertures H H of the plate G.

Each side edge, K K, of the triangular cutting-plate, from its forward right-angled point to its rear acute-angled points, is beveled on its upper side, as shown, and the plate is also slightly curved or convexed, as shown, to cause it to enter and pass through the ground with the greatest amount of ease and certainty and the lowest degree of friction.

My new and improved cultivator teeth or hoes are adapted to be secured in operative position in the frame of any ordinary harrow, the vertical upper ends, E, or parts of their shanks being adapted to be secured in the apertures C of such a frame, in which the ordinary harrow-teeth are usually secured, and when thus secured the improved hoes are ready for operation, the stems or shanks inclining, slanting backward, with one of their four corners in front, so that they will not catch and drag trash, but will pass easily and readily through the same, while the convexed cutting-plates, with their cutting-edges diverging from their forward points and beveled on their upper sides, as set forth, will enter and pass through the ground with the greatest amount of ease and the lowest degree of friction.

From the foregoing description, taken in connection with the accompanying drawings, the construction, operation, and advantages of my invention will be readily understood. It will be seen that my new and improved cultivator teeth or hoes are simple, strong, and cheap in construction, and can be secured in any ordinary harrow-frame ready for operation, and that they are exceedingly efficient in their operation.

Having thus described my invention, what I claim, and desire to secure by Letters Patent of the United States, is—

The combination of the shank, formed with the vertical and inclined portions and with a flat apertured thin plate at its lower end, which extends rearwardly at an angle to the inclined portion, with a triangular plate having its forward edges beveled to produce cutting-edges, and having an upper convex portion, and bolts or rivets for securing said triangular plate to the plate of the shank.

In testimony that I claim the foregoing as my own I have hereunto affixed my signature in presence of two witnesses.

SIMEON R. ESTEP.

Witnesses:
SAML. W. TEAGUE,
A. J. TEAGUE.